US009525928B2

(12) United States Patent
Moore

(10) Patent No.: US 9,525,928 B2
(45) Date of Patent: Dec. 20, 2016

(54) EXERCISE SYSTEM WITH HEADPHONE DETECTION CIRCUITRY

(71) Applicant: Jeffrey W. Moore, West Barnstable, MA (US)

(72) Inventor: Jeffrey W. Moore, West Barnstable, MA (US)

(73) Assignee: Michael G. Lannon, Orleans, MA (US)

( * ) Notice: Subject to any disclaimer, the term of this patent is extended or adjusted under 35 U.S.C. 154(b) by 0 days.

(21) Appl. No.: 14/503,632

(22) Filed: Oct. 1, 2014

(65) Prior Publication Data
US 2016/0100242 A1   Apr. 7, 2016

(51) Int. Cl.
*A63B 71/00* (2006.01)
*H04R 1/10* (2006.01)
(Continued)

(52) U.S. Cl.
CPC ......... *H04R 1/1041* (2013.01); *A63B 22/0076* (2013.01); *A63B 22/02* (2013.01); *A63B 22/04* (2013.01); *A63B 22/0605* (2013.01); *A63B 22/201* (2013.01); *A63B 24/00* (2013.01); *H04R 2420/05* (2013.01)

(58) Field of Classification Search
CPC ..... A63B 22/0076; A63B 22/02; A63B 22/04; A63B 22/06; A63B 22/0605; A63B 22/0664; A63B 22/20; A63B 22/201; A63B 24/00; A63B 24/0059; A63B 24/0062; A63B 24/0075; A63B 24/0084; A63B 24/0087; A63B 2024/0065; A63B 2024/0068; A63B 2024/0071; A63B 2024/0078; A63B 2024/0081; A63B 2024/009; A63B 2024/0093; A63B 2024/0096; A63B 69/0028; A63B 69/06; A63B 69/16; A63B 69/18; A63B 71/0619; A63B 71/0622; A63B 71/0686; A63B 2071/0625; A63B 2071/0627; A63B 2071/063; A63B 2071/0675; A63B 2071/068; A63B 2220/80; A63B 2220/808; A63B 2220/83; A63B 2220/833; A63B 2244/19; H04R 1/1041; H04R 5/03; H04R 2420/05; H03F 3/68
(Continued)

(56) References Cited

U.S. PATENT DOCUMENTS 6,988,905 B2 *   1/2006   Corey ................. H01R 13/665
                                                                                        381/74
7,167,569 B1 *   1/2007   Seven ..................... H04R 5/04
                                                                                       330/124 R
(Continued)

OTHER PUBLICATIONS

"Cardio-Based Exercise Systems with Visual Feedback on Exercise Programs" Joshua J. Roman et al., filed Oct. 1, 2014.

Primary Examiner — Stephen Crow
Assistant Examiner — Gary D Urbiel Goldner
(74) Attorney, Agent, or Firm — Fish & Richardson P.C.

(57) ABSTRACT

Described is a circuit arrangement for detection of a tone whose presence indicates insertion of a headphone plug into a jack. The circuit includes a receptacle having contacts configured to receive a plug inserted into the receptacle, a current sense circuit, an amplifier coupled to the current sense circuit and a band pass filter coupled to an output of the amplifier, the band pass filter configured to pass a signal having a frequency in a range of about 2 Hz to 20 Hz. Circuitry converts the passed signal into a digital signal to provide an input signal to a controller to indicate that a headphone plug was inserted into the receptacle.

21 Claims, 6 Drawing Sheets

(51) Int. Cl.
*A63B 24/00* (2006.01)
*A63B 22/00* (2006.01)
*A63B 22/02* (2006.01)
*A63B 22/04* (2006.01)
*A63B 22/06* (2006.01)
*A63B 22/20* (2006.01)

(58) Field of Classification Search
USPC .... 381/74, 120, 384; 700/94; 482/1, 3, 4, 8, 482/9
See application file for complete search history.

(56) References Cited

U.S. PATENT DOCUMENTS

| | | | | |
|---|---|---|---|---|
| 7,227,958 | B2* | 6/2007 | Hsieh | H01R 24/58 324/538 |
| 7,916,875 | B2* | 3/2011 | Kanji | H01R 29/00 381/58 |
| 8,059,838 | B2* | 11/2011 | Wu | H04R 3/00 381/111 |
| 8,105,207 | B1 | 1/2012 | Lannon et al. | |
| 8,167,776 | B2 | 5/2012 | Lannon et al. | |
| 8,831,234 | B2* | 9/2014 | Turner | H03K 5/1254 381/58 |
| 9,050,487 | B2* | 6/2015 | Lannon | A63B 24/0062 |
| 9,060,228 | B2* | 6/2015 | Lee | H04R 29/004 |
| 9,215,526 | B2* | 12/2015 | Chen | H04R 29/004 |
| 9,326,079 | B2* | 4/2016 | Tu | H04R 29/00 |
| 2001/0053228 | A1* | 12/2001 | Jones | G10K 11/1788 381/71.6 |
| 2005/0053243 | A1* | 3/2005 | Ganton | H04R 5/04 381/58 |
| 2007/0104332 | A1* | 5/2007 | Clemens | H01R 13/641 381/56 |
| 2007/0110252 | A1* | 5/2007 | Garcia | H04R 5/00 381/58 |
| 2008/0139042 | A1* | 6/2008 | Liang | H04R 5/04 439/489 |
| 2009/0175456 | A1* | 7/2009 | Johnson | H04R 5/04 381/1 |
| 2009/0316926 | A1* | 12/2009 | Hung | H04R 3/00 381/71.6 |
| 2010/0029344 | A1* | 2/2010 | Enjalbert | H04M 1/6058 455/569.1 |
| 2010/0173749 | A1* | 7/2010 | Lannon | A63B 24/0062 482/8 |
| 2011/0150234 | A1* | 6/2011 | Johnson | H01R 13/703 381/74 |
| 2011/0268291 | A1* | 11/2011 | Ha | H04R 1/1041 381/74 |
| 2012/0093328 | A1* | 4/2012 | Hsi | H04R 5/04 381/58 |
| 2012/0200172 | A1* | 8/2012 | Johnson | H04R 29/001 307/116 |
| 2012/0207318 | A1* | 8/2012 | Tsuchiya | H04R 3/00 381/71.6 |
| 2012/0214645 | A1* | 8/2012 | Lannon | A63B 24/0062 482/4 |
| 2013/0020882 | A1* | 1/2013 | Prentice | H04R 29/004 307/116 |
| 2013/0129109 | A1* | 5/2013 | Jung | H04R 1/1041 381/74 |
| 2013/0148820 | A1* | 6/2013 | Sagong | H04R 1/1041 381/74 |
| 2013/0156216 | A1* | 6/2013 | Shah | H04R 5/04 381/74 |
| 2013/0223641 | A1* | 8/2013 | Lin | H04M 1/72527 381/77 |
| 2013/0336506 | A1* | 12/2013 | Prentice | H04R 3/00 381/309 |
| 2014/0003616 | A1* | 1/2014 | Johnson | H04R 29/001 381/74 |
| 2014/0017955 | A1* | 1/2014 | Lo | H01R 13/703 439/668 |
| 2014/0038460 | A1* | 2/2014 | Lee | H04R 29/004 439/620.01 |
| 2014/0050330 | A1* | 2/2014 | Allen | H04R 3/00 381/74 |
| 2014/0100001 | A1* | 4/2014 | Im | H04M 1/6058 455/570 |
| 2014/0219463 | A1* | 8/2014 | Poulsen | H04R 5/04 381/58 |
| 2014/0225632 | A1* | 8/2014 | Oh | H04R 29/004 324/713 |
| 2014/0233741 | A1* | 8/2014 | Gustavsson | H04R 5/04 381/58 |
| 2014/0241535 | A1* | 8/2014 | Poulsen | H04R 5/04 381/58 |
| 2014/0277643 | A1* | 9/2014 | Villarreal | G06F 17/3074 700/94 |
| 2014/0300455 | A1* | 10/2014 | Tsuzuki | B60Q 5/008 340/425.5 |
| 2014/0301562 | A1* | 10/2014 | Tu | H04R 3/00 381/74 |
| 2014/0314238 | A1* | 10/2014 | Usher | G10L 19/008 381/17 |
| 2014/0348334 | A1* | 11/2014 | Ko | H04R 29/001 381/58 |
| 2015/0036859 | A1* | 2/2015 | Tu | H04R 29/001 381/334 |
| 2015/0055785 | A1* | 2/2015 | Donaldson | H04R 1/1083 381/58 |
| 2015/0055793 | A1* | 2/2015 | Toda | H04R 25/556 381/74 |
| 2015/0063587 | A1* | 3/2015 | Park | H04R 1/1016 381/74 |
| 2015/0078577 | A1* | 3/2015 | Cimaz | H04R 29/004 381/74 |
| 2015/0098579 | A1* | 4/2015 | Holzmann | H04R 29/004 381/71.6 |
| 2015/0117663 | A1* | 4/2015 | Hsu | H04R 1/1041 381/74 |
| 2015/0296291 | A1* | 10/2015 | Macours | H04R 1/1041 381/74 |
| 2015/0358719 | A1* | 12/2015 | Mackay | G06F 11/3051 381/384 |
| 2016/0094906 | A1* | 3/2016 | Keskin | H04R 1/1041 381/74 |

* cited by examiner

EXERCISE SYSTEM WITH HEADPHONE DETECTION CIRCUITRY

BACKGROUND

This invention relates to exercise equipment and more particularly to use of audio direction from the exercise equipment through user headphones.

Regular exercise and physical activity are both important and beneficial for long-term health and well-being. Some of the benefits of exercise and physical activity include a reduced risk of premature death, heart disease, high blood pressure, cholesterol and a reduced risk of developing colon cancer and diabetes. In addition, the benefits of exercise and physical activity further include a reduced body weight, a reduced risk of depression and improve psychological well-being.

As such, various types of exercising equipment are currently known that enable an operator to exercise. Some exercising equipment may require the expertise of an instructor or a personal trainer to teach the operator the proper techniques and usage of the equipment. Also, some exercising equipment have provisions for a user to insert headphones into a headphone jack. Some exercise equipment need to detect that the headphones have been inserted. Generally, prior approaches have used switches or electrical contacts embedded into a headphone jack that makes or breaks contact when a headphone plug is inserted by mechanical means. These jacks are difficult to source in various sizes and mounting options.

SUMMARY

According to an aspect, a circuit is configured to detect insertion of a plug into a receptacle having contacts configured to receive the plug. The circuit includes a current sense circuit, an amplifier coupled to the current sense circuit, a band pass filter coupled to an output of the amplifier, the band pass filter configured to pass a signal having a frequency in a range of about 2 Hz to 20 Hz and circuitry to convert the passed signal into a digital signal to provide an input signal to a controller to indicate the presence of a plug inserted into the receptacle.

According to an additional aspect, a system includes a cardio exercise machine, a receptacle having contacts configured to receive a plug inserted into the receptacle supported by the cardio exercise machine, a plug insertion detector circuit including a current sense circuit, an amplifier coupled to the current sense circuit, a band pass filter coupled to an output of the amplifier, the band pass filter configured to pass a signal having a frequency in a range of about 2 Hz to 20 Hz, circuitry to convert the passed signal into a digital signal to provide an input signal to a controller to indicate the presence of a plug inserted into the receptacle, and a controller that receives the digital signal to control generation of audio direction to a user of the cardio exercise machine.

One or more of the above aspects may include one or more of the following advantages. exercise.

The circuit detects the presence of a tone. Thus, for some equipment, such as exercising equipment, that provides audio coaching such as directions from an instructor or a personal trainer the circuit detects the insertion of headphones into a headphone jack. The equipment detects that the headphones have been inserted and can commence instructions. This provides an electronic approach that avoids difficulties associated with prior approaches that have used switches or electrical contacts.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
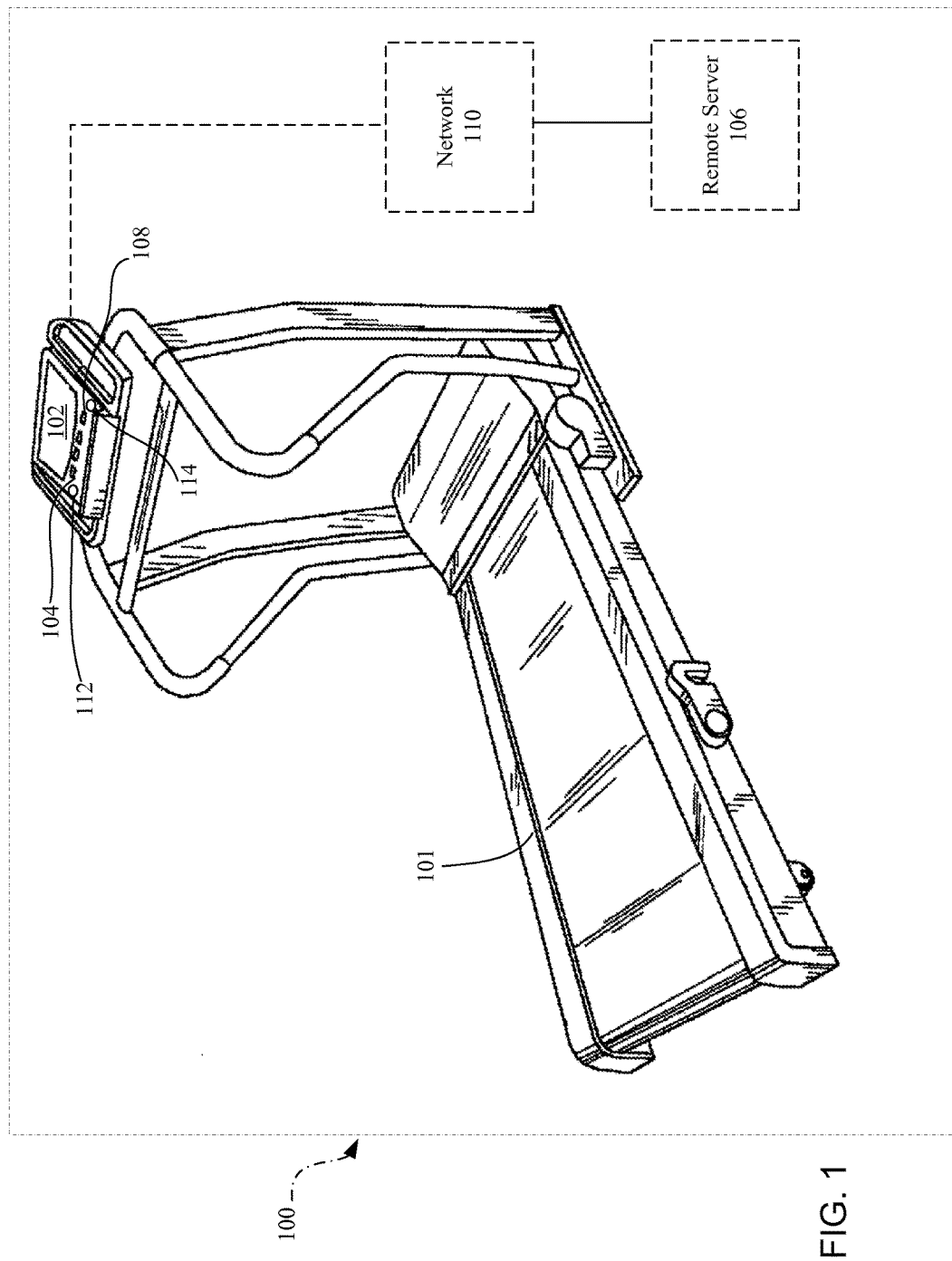
FIG. 1 is a diagram depicting an exercise apparatus.

Referring to FIG. 1, a system 100 is shown to include an exemplary cardio exercise machine 101. While the cardio exercise machine 101 depicted in FIG. 1 is a treadmill, the techniques described below could be implemented in many different types of cardio exercise machines such as stationary bicycles, recumbent stationary bicycles, stair-climbers, elliptical trainers, ski-trainers, rowing machines, step mills, versa climbers, arc trainers, or hand ergometers. A cardio-machine is typically characterized by an exercise that involves significant cardiovascular exertion in contrast to strength machines that are typically involved with weight training.

Cardio exercise machine 101 enables a user (not shown) to exercise by operating the cardio exercise machine (e.g., by running on the treadmill).

The cardio exercise machine includes an exercise system (FIG. 2) to manage operations of the cardio exercise machine. The exercise system controls the operations of the cardio exercise machine according to data associated with the user (sometimes referred to as "user-specific data") that is stored in a memory device. Examples of a suitable memory device include a removable universal storage bus (USB) storage device, a hard drive on a computer communicating with the exercise machine over a network (e.g., the Internet), or other types of removable storage media, such as compact disks (CDs), digital video disks (DVDs), cassette disks, or floppy disks. In some examples of the memory, a remote server 106 stores the user-specific data in a remote type of storage device, and communicates with the cardio exercise machine over a network 110.

In FIG. 1, the cardio exercise machine is configured to communicate with the memory device via a port 104 into which the memory device may be inserted. In FIG. 1, the memory device is a (USB) storage device. The memory devices may also communicate wirelessly with the cardio exercise machine.

The cardio exercise machine provides a user with a plurality of multi-session cardio programs that are customized to the user's level of fitness. The workouts provided to a user are based on the user-specific data. The user-specific data includes both "personal data" and "performance data." Personal data includes a user's level of fitness that is calculated by the exercise system using a variety of factors such as age, weight, height, gender, and factors determined by a questionnaire where answers are entered into the machine via a graphical user interface rendered by the exercise system on the display 102. Alternatively, the personal data can be obtained by an on-machine testing protocol, such as a stress test that is administered by the machine automatically based on default settings at an initial use, and, which can be administered periodically, thereafter.

For example, the cardio exercise machine 101 includes display 102 that displays questions (e.g., "What is your age?"). The system presents these questions to the user and the user enters answers to these questions in the GUI. The exercise system calculates the user's level of fitness based on the answers to these questions. The user enters responses to the questions by actuating buttons 108 on the cardio exercise machine or by speaking answers to the questions into a microphone (not shown). Other techniques can be used. The user may have the option of changing the personal data if, for example, some of the information contained within the personal data has changed (e.g., if the user has lost weight, the user can update his stored weight).

The exercise system customizes workout programs based on data stored from previous workout sessions. This data includes information relating to a user's performance on past workouts, and is sometimes referred to as "performance data." These factors are combined to calculate a "fitness level" (e.g., on a numeric scale of 1-100), where the fitness level is used to modify the intensity and type of various standard workouts. For example, if a user has previously completed a workout program on a treadmill, the user might be assigned a score of "85" by the exercise system based on his performance (e.g., the user might have earned a score of "100" if he had not slowed down during a portion of the workout). A user's fitness level can be modified based on the user's performance during past workout sessions, or by re-entering other personal information.

During a session, the cardio exercise machine provides feedback in the form of exercise guidance and instruction via a combination of on-machine messaging, automatic machine control of speed, incline, intensity, and resistance via the Communications Specification for Fitness Equipment protocol (CSAFE) or other proprietary protocols, and audio-based coaching and content. If a user is exercising on a treadmill, for example, the treadmill could increase the incline and speed of its conveyer belt to augment the intensity of the user's workout. This could be in response to, for example, a scripted workout program, or in response to a user's current workout performance (e.g., by sensing a heart rate of the user).

Guidance information, such as audio coaching, is received by a user in a number of ways. In some implementations a user connects an existing personal audio device (e.g. an iPod®, an MP3 player, a CD player, etc.) into a line-in jack 112 on a processor board (FIG. 2) and connects user-wearable headphones 208 (FIG. 2) into a line out jack 114 on the processor board. In some examples, connections between the personal audio device and the processor board can be wireless connections (e.g., a Bluetooth® connection).

In other implementations, the guidance information resides in the cardio platform on processor board. In these implementations, the user connects user-wearable headphones 208 (FIG. 2) into a line out jack 114 on the processor board and the controller supplies audio coaching and music directly to the user, via the headphones without the need for a personal audio device.

Once connected, the software can automatically fade, e.g., music while playing the audio coaching information. The user-provided audio resumes and plays during time intervals where coaching information is not being transmitted. The user can also connect headphones into a line-out jack on the processor board, and the software plays the audio coaching information. In some examples, the user can connect headphones to the personal audio device, and a different connection can link the personal audio device with the processor board. The processor board can also provide music or other content when coaching information is not being transmitted.

Once a session is completed, data pertaining to the user's performance on that session is written to the memory device, and that information is sent to a remote server system where the information is recorded (e.g., remote server 106) such that the information can be viewed via access to a web site. Future exercise sessions and programs are tailored to incorporate a user's past performance(s) and adherence to the past programs and sessions. In some examples, the audio coaching information is generated based upon a user's fitness level and performance data. For example, the audio coaching data could be constructed from a library containing a plurality of workout programs that have associated audio coaching data. A program then selects a workout program based on the personal and performance data specific to the user. In some examples, a customized workout program is constructed for a user by selecting one or more segments from different workout programs and combining them into one customized workout program. Each segment has associated audio coaching data that is combined to present the user with a guided workout program. The custom workout program is stored on one or more of the memory device 212 (FIG. 2) and the remote server 106 for later retrieval and execution by the cardio exercise machine.

Figure 2:
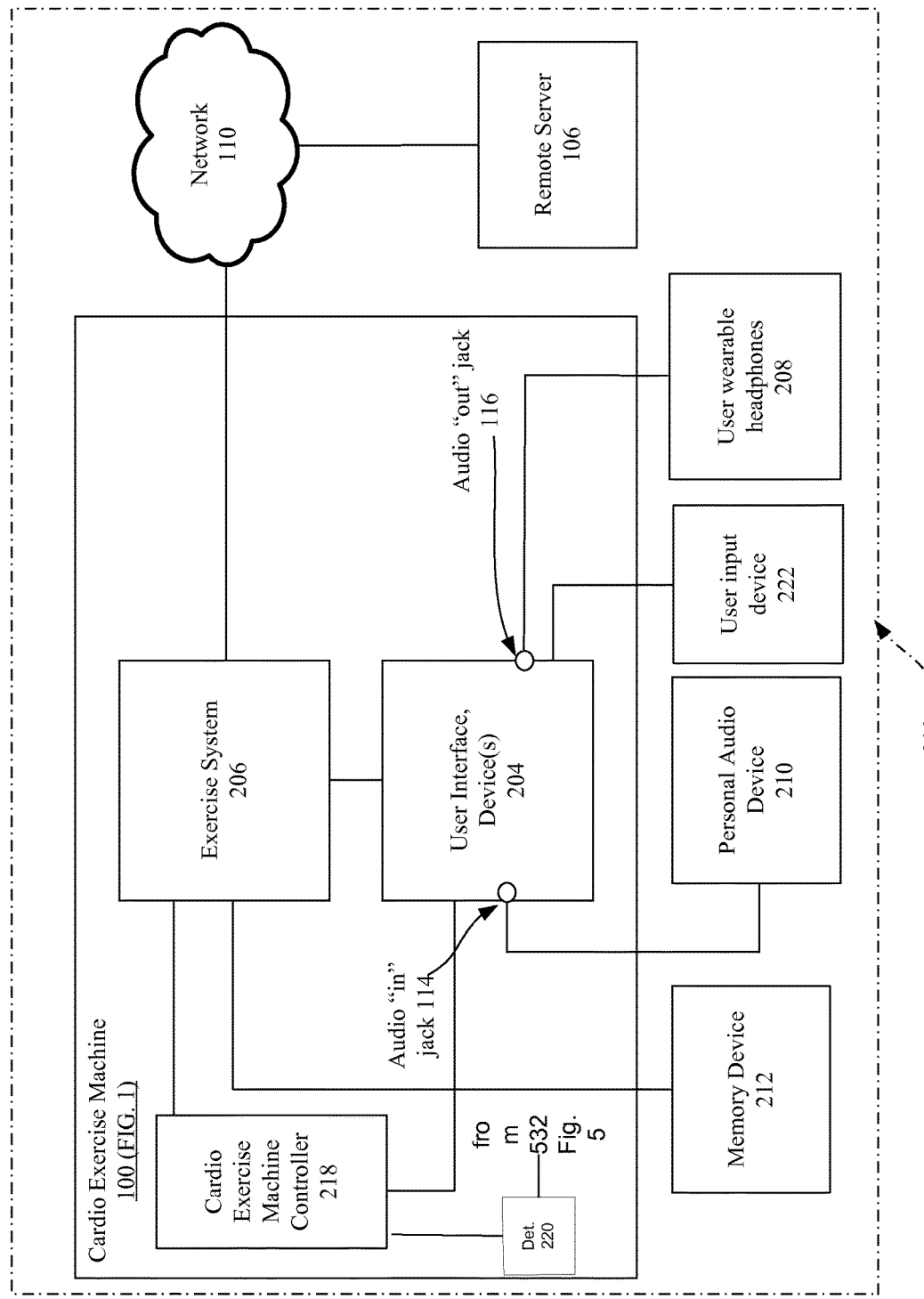
FIG. 2 is a diagram depicting an exercise apparatus that includes an exercise system.

Referring to FIG. 2, a system 200 is shown that includes a cardio exercise machine 101 such as the treadmill shown in FIG. 1. The cardio exercise machine 101 includes an exercise system 206 that controls functions relating to the operation of the cardio exercise machine, data management, and interactions with a user. The exercise system 206 can be implemented in a plurality of ways. In some examples, the exercise system 206 is implemented as a processor board and/or software. The processor board can be installed in, on, or near the cardio exercise machine 101 and may be mounted internally or externally. The software can also be configured to run on a cardio exercise machine's existing software platform that mimics the features of a customized processor board and software.

Memory device 212 communicates with the exercise system 206 in one or more of the previously-described manners to, among other things, control the operations of the cardio exercise machine 101. The mechanical operation of the cardio exercise machine 101 is controlled, for example, by a cardio exercise machine controller 218 that can receive instructions from a plurality of sources. A user controls the operations of the cardio exercise machine 101 directly via a user input device 222 (e.g., by actuating a button that manually increases the speed of a conveyer belt on a treadmill).

User input device 222 includes buttons (e.g., pressure-sensitive buttons, a touch screen, etc.), dials, a keypad, and other mechanisms that allow a user to input data into the exercise system. User interface, devices 204 includes a graphical display (e.g., an LCD screen, a series of LED lights, etc.) and/or a speaker to provide audio feedback to the user. The user interface, devices 204 communicates with the exercise system 206 to provide audio and visual feedback about the performance of the user during a workout program, and to provide operating details related to the cardio exercise machine (e.g., a display of the user interface, devices 204 displays the time remaining in the current workout program).

The exercise system 206 also provides audio feedback to the user that is coordinated with the playback of user-provided audio content provided by a personal audio device 210. The personal audio device 210 communicates with the user and the exercise system via any of the connection techniques described above. In the example of FIG. 2, the user receives audio (e.g., music, audio feedback, or guidance information) from the exercise system 206 by connecting user-wearable headphones 208 to the audio "out" jack 116 (FIG. 1). In the same example, the exercise system 206 communicates with the personal audio device 210 via the audio "in" jack 114 (FIG. 1). Alternatively, the exercise system 206 can receive media over a network 110 from a remote server 106, which is provided to the user via user interface, devices 204 (e.g., a display on the user interface, devices 204 could display a video to the user), or via one or more audio connection methods. Also included is a headphone, e.g., a plug insertion detection circuit 220 (discussed in FIGS. 5 and 6).

As described above, the exercise system 206 optionally communicates with a remote server 106 to transmit and receive personal and performance data, as well as workout programs and other information. In some examples, the remote server 106 publishes the personal and performance data of a user such that the user can view workout data on a website, news feed (e.g., an RSS feed), or in an email sent to the user from the remote server 106. In this way, the user can visualize, track, organize, and manage his workout progress.

Figure 3:
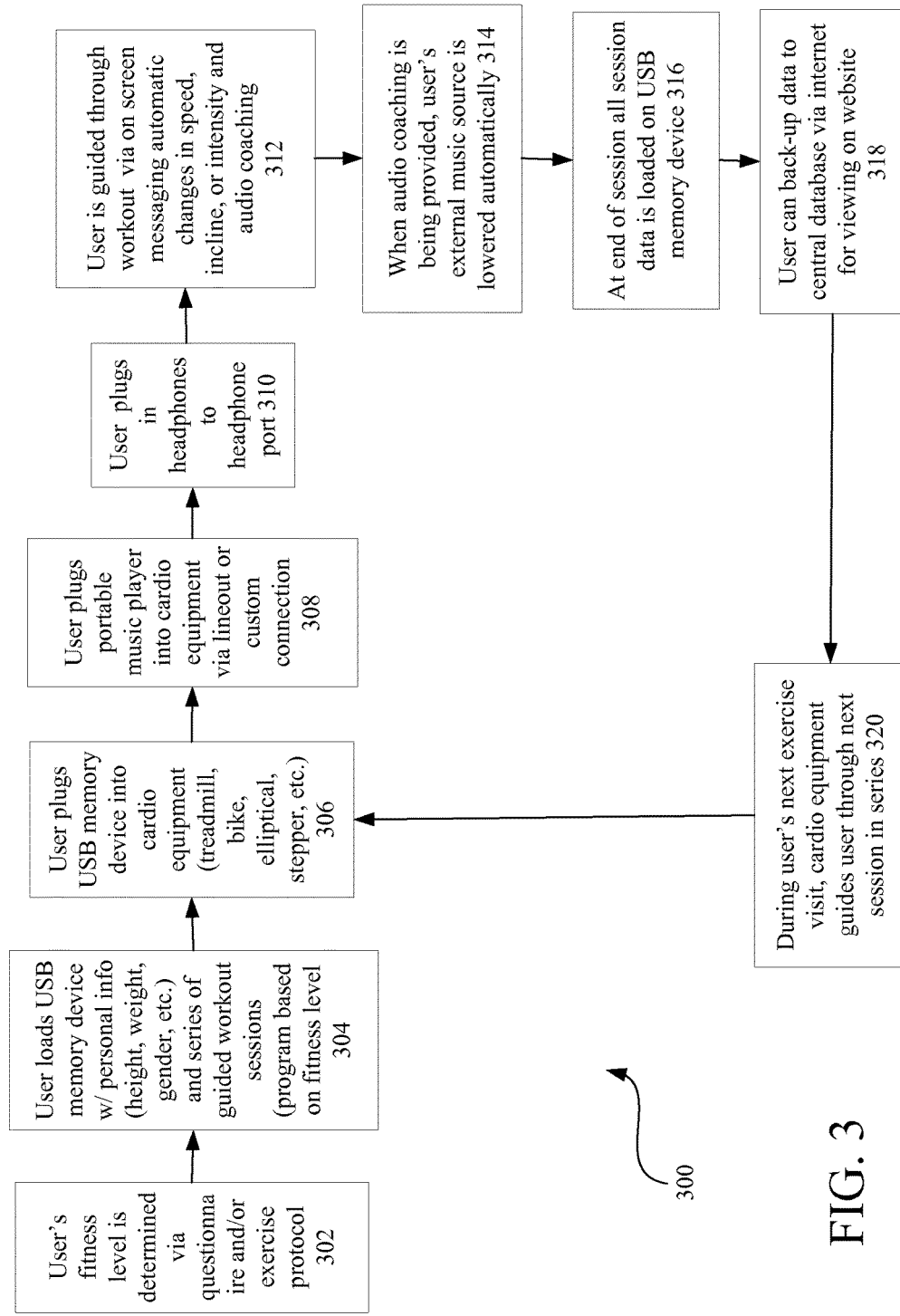
FIGS. 3 and 4 are flow charts of processing that control the exercise apparatus of FIG. 1.

Referring to FIG. 3, a process 300 to control the exercise system is shown. The process flow 300 relates to an example where a USB memory device stores user-specific data and is used in administering the workout session. If it is a user's first workout, the user's fitness level is determined 302 via the previously-described questionnaire, exercise protocol, or other method. The user loads 304 the USB memory device into the machine. The USB device includes one or more guided workout sessions that were determined by the exercise system based on the user's fitness level and are stored on the memory device. In some examples, users load new programs onto the memory device 212 via the Internet or at health club locations. The user inserts 306 the USB memory device into the cardio exercise machine, and connects 310 headphones into a provided jack. The user begins operation of the cardio exercise machine, and is guided 312 via one or more of on-screen messaging, automatic adjustments in speed, incline, or intensity, or audio coaching.

It is desirable for the equipment to reliably detect whether a person has inserted headphones into the headphone jack 112, 114 without the need for mechanical switches, special headphone jacks or any mechanical assistance. Circuitry to detect that a headphone has been inserted into a jack is discussed in conjunction with FIG. 5, below. In optional implementations based on a user supplied player, when the cardio exercise machine is attempting to provide audio coaching to the user, the cardio exercise machine lowers 314 the volume of the user-provided audio content (e.g., the music playing on the user's mp3 player). Similarly, the cardio exercise machine restores the volume of the user-provided audio content after the audio coaching has been provided. In another example, an imbedded device manages cardio exercise equipment with user-specific exercise programming and activity tracking That is, the removable storage functionality is not necessary in some implementations.

Figure 4:
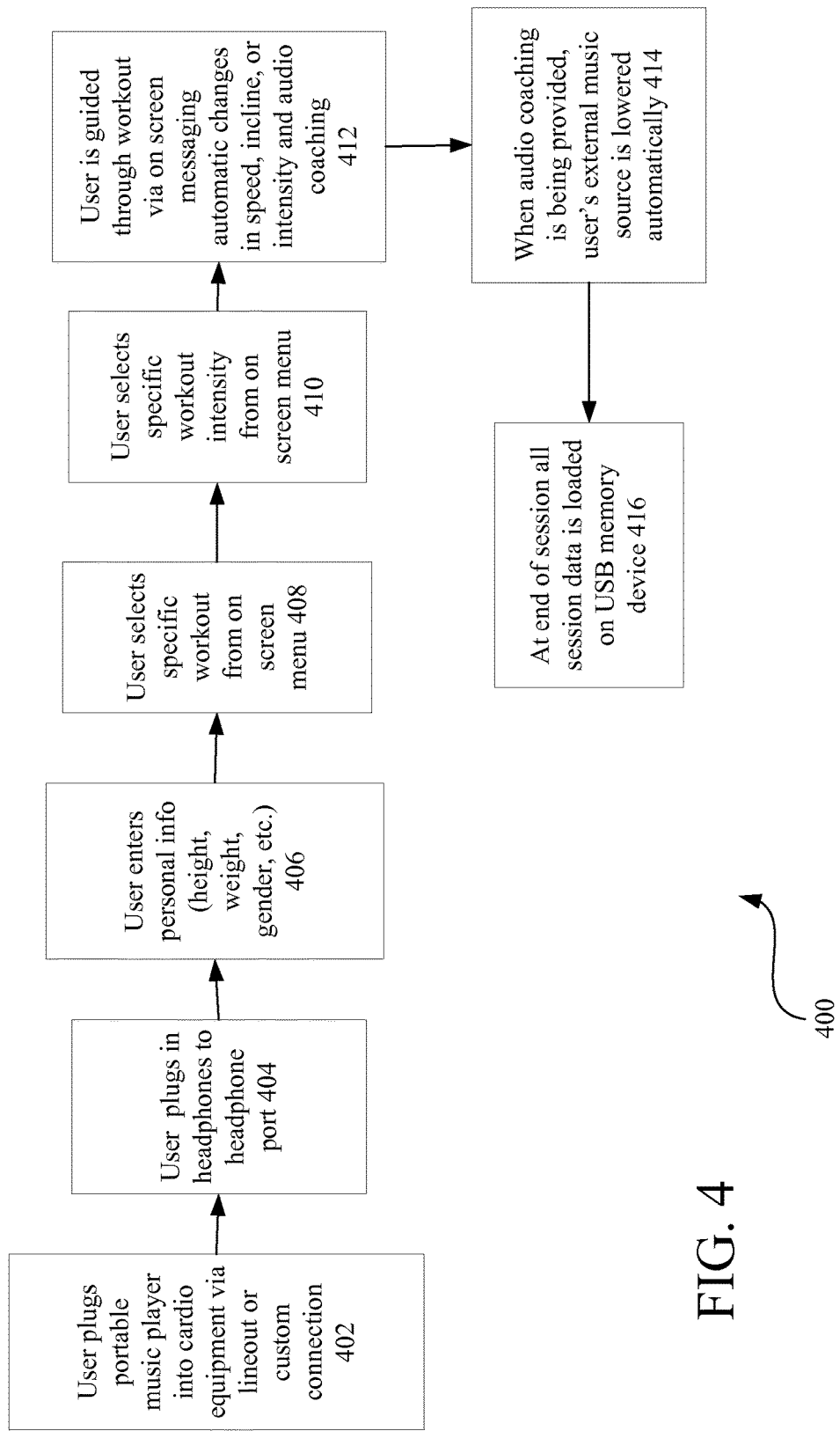

Referring to FIG. 4, a process 400 to control the exercise system is shown. The user connects 402 a personal audio device to the exercise system and also connects 404 headphones to a headphone jack (e.g., a port on the cardio exercise or machine, a port on the personal audio device, depending on the configuration). The user enters 406 personal information into the exercise system using the user interface, devices 204 (FIG. 2).

In some examples, an exercise system includes a set of "pre-loaded" exercise sessions that are selectable by the user. Cardio programs are personalized to each user's level of fitness using a number of factors, including an on-machine testing protocol, and other factors described above. The user selects 408 a workout from an onscreen menu, or from a list of workouts provided audibly to the user from the exercise system. The user can also select 410 custom options relating to the workout (e.g., the intensity of the workout, the type of workout, etc.). The exercise system provides 412 exercise guidance and instruction via a combination of on-machine messaging, automatic machine control of speed, incline, intensity, etc. via the CSAFE protocol or other proprietary protocols, and audio-based coaching and content.

Again, for the audio coaching, in some implementations, a user can connect an existing personal audio device (e.g. iPod, MP3 player, CD player, etc.) into a line-in jack on the processor board, connect headphones into a line out jack on the new processor board, and then the software will automatically fade 414 the user-provided audio (e.g., music) while playing the audio coaching information. The user's music will then resume playing during time intervals where coaching information is not being transmitted. In other embodiments, a user connects headphones into a line-out jack on the processor board, and software will plays the audio coaching information. The processor board can also provide music or other content when coaching information is not being transmitted. In any event, at the end of the session the user's performance data is displayed 416 on the screen. Audio content and messaging may be fixed for the life of the machine, or could be updated via a management function or future networking of the equipment.

Figure 5:
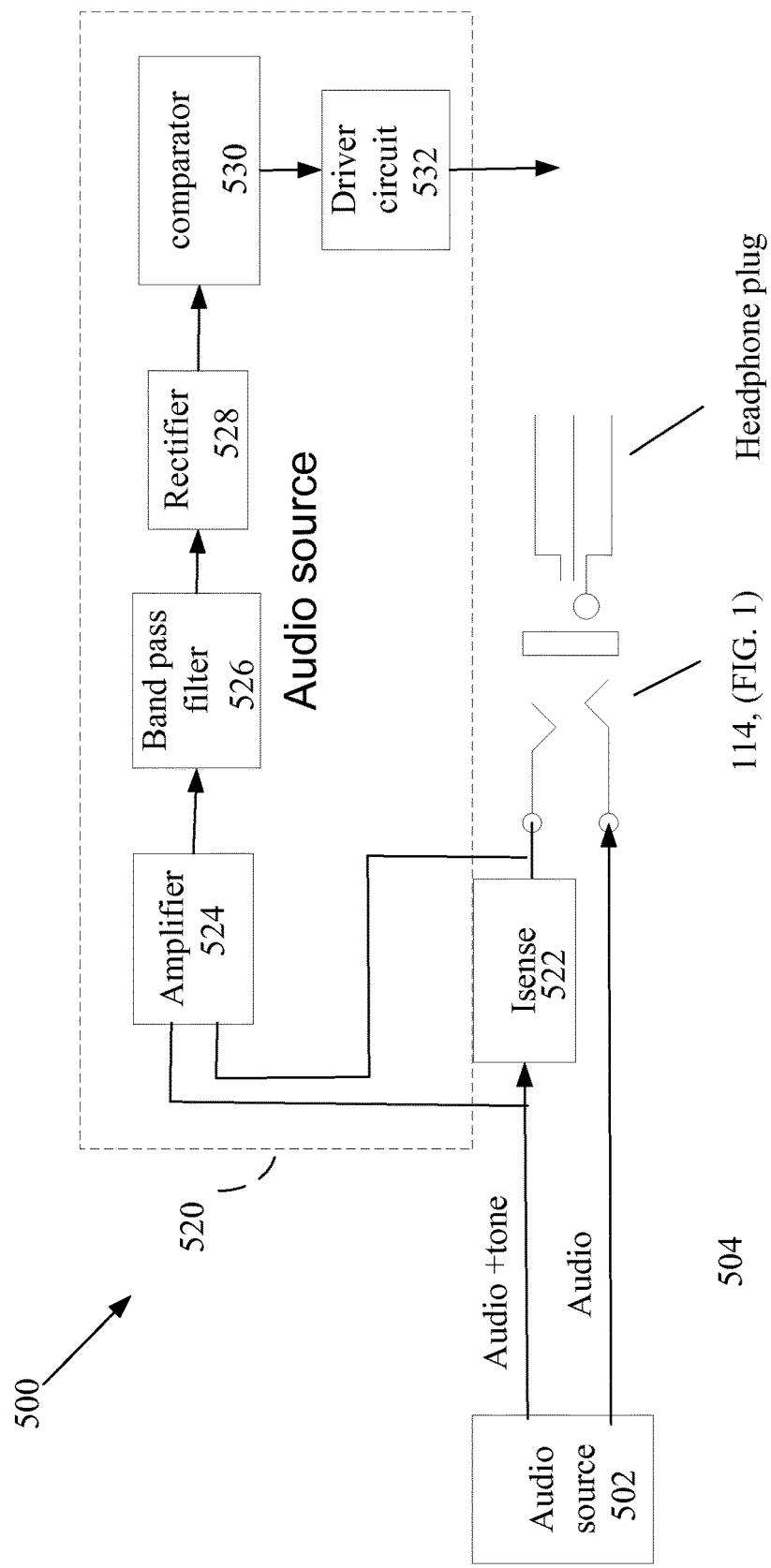
FIG. 5 is a block diagram of a plug insertion detection circuit.

Referring to FIG. 5, a circuit 500 that detects inserting of a headphone plug into a jack is shown. In particular the circuit 500 detects insertion of a plug, e.g., a headphone plug into line out jack 114 (FIG. 1). The circuit 500 detects the presence of a superimposed sub audible audio signal onto an audio output signal from an audio source 502. As shown in FIG. 5, a tone is inserted on one of the channels (left or right headphone channel) within audio directions that come from the controller (218 FIG. 2), with the tone insertion being done by software running on the controller. This tone is a sub-audio signal, e.g., having a frequency of about 2 hertz up to about 20 hertz, a range of 8 Hz to 18 Hz with 15 Hz (being a suitable example) tone at relatively low amplitude of level of in a range of about −18 db to −6 db SPL (sound pressure level) upon an audio output from the audio source 502. As an alternative a tone insertion circuit including a mixer diode could be used.

Sound pressure is the local acoustic pressure deviation from the ambient (average, or equilibrium) atmospheric pressure, caused by a sound wave. Sound pressure level (SPL) is a logarithmic measure of the effective sound pressure of a sound relative to a reference value. It is measured in decibels (dB) in comparison with a standard reference level, where −18 db to −6 db SPL indicates a level that is below the standard reference, i.e., ambient pressure level on the ear. Because the tone is at a sub audible frequency, the tone cannot be heard over the headphones by a user. It is generally accepted that the typical range of human hearing extends from about 20 Hz to 20,000 Hz, and the range decreases with age. The output of the tone insertion circuit 504 (illustrated) or the audio source circuit 500 (when the tone insertion circuit 504 is integrated with the audio source) is coupled to the line out jack 114 (FIG. 1).

Also connected to the line out jack is a sub-audible tone detector circuit 520. The circuit 520 includes a current sensing element 522, e.g., a resistor that is placed in line and in series with one (either the left or right) line of the line output jack 114 that feeds a headphone audio output from the audio system 502 with the superimposed sub-audible tone, when a plug on the headphone is inserted into the jack 114.

As the connection of a plug on the headphones (not shown) when inserted into the jack provides a small resistance and the current sensing element draws a small current that current produces a voltage drop across the sense circuit 522 and this voltage can be used to detect the presence of the insertion of the headphone by detecting the presence of the tone. The tone detection circuit 520 includes an amplifier 524 that amplifies the voltage across the current sense circuit 522 to a level for further processing. A filter 526, e.g., a band pass filter is placed to filter the voltage and allow only the sub audible tone to be passed. A rectifier integrated into an op amp 528 provides an AC to DC conversion of the tone signal. This voltage is directly proportional to the level of the sub-audible tone. A comparator 530 with a fixed voltage threshold is used to compare the level of the sub audible tone to a fixed voltage. The output of the comparator provides an input to a FET transistor 532 that provides a buffer driver circuit to drive a signal back to the controller 218 (FIG. 2). The comparator 530 thus converts the rectified signal into a digital output signal that can drive the transistor. The output of the comparator drives a FET transistor provide a signal where a high state indicates presence of the plug and thus the headphone into the jack 114 and the low state of the signal indicates the absence of plug in the jack 114. This signal fed to the controller 218 (FIG. 2) can be used to modify the operation of the controller. For example, the detection of the presence of the tone, indicates that the headphones have been plug in and the guidance program can start delivering audio coaching information. On the other hand if the tone has not been detected, warning messages etc. can be generated and displayed to the user via the display.

Figure 6:
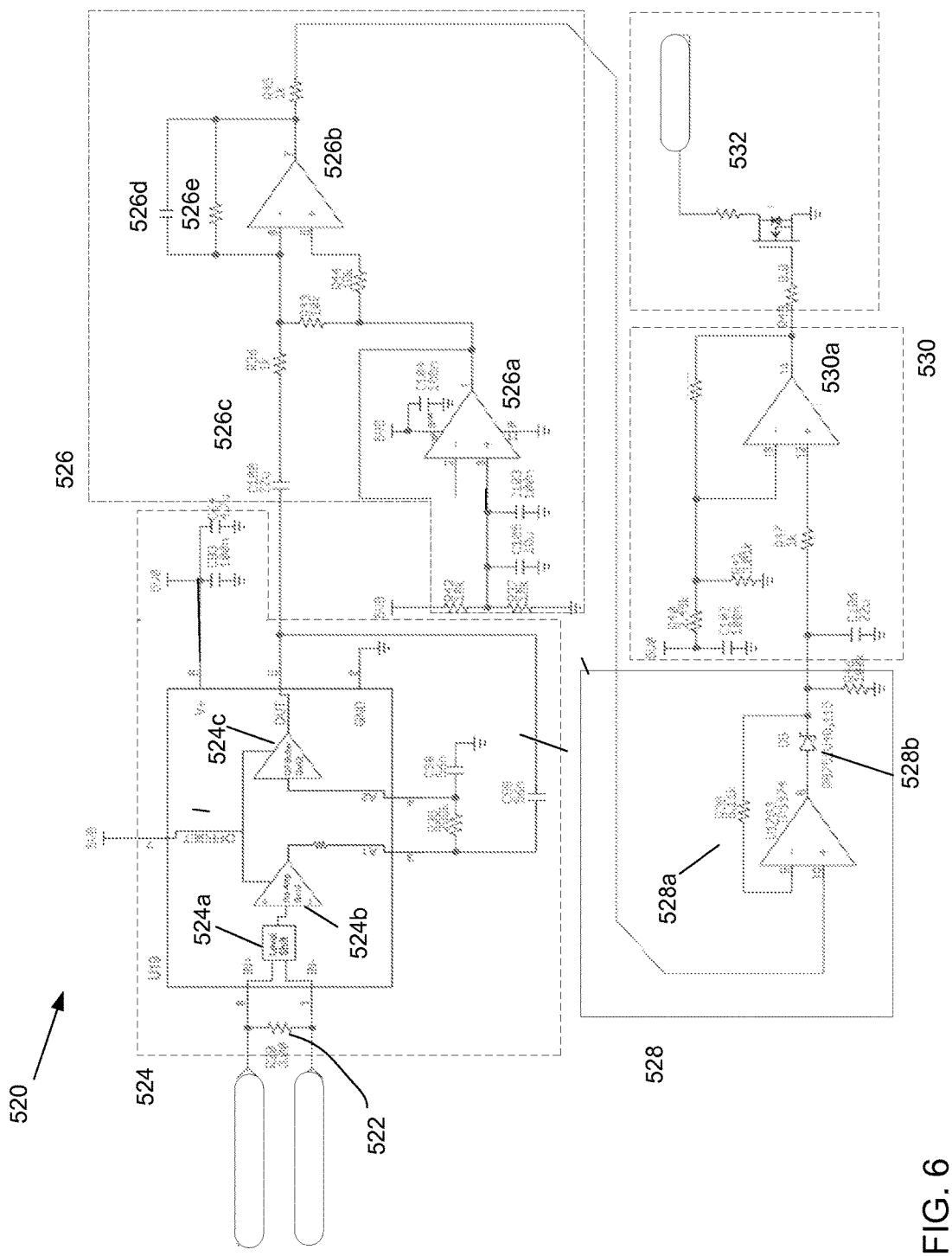
FIG. 6 is a schematic diagram of an exemplary plug insertion detection circuit.

Referring now to FIG. 6, an implementation of the detector circuit is shown. The tone detection circuit 520 of FIG. 5 is shown. Resistor 522 is shown as the current sensing element that receives the signals from connection of headphones into the jack. The amplifier 524 also includes a level shifter 524a to shift signal levels received from the jack. The amplifier also includes a pre-amplifier 524b and buffer amplifier 524c with suitable bias and power filtering components (shown but not referenced) to amplify the voltage across the current sense circuit 522 to a level for further processing. A typical value of the resistor 522 is several ohms, e.g., 3-15, e.g., 3 ohms. Other relatively low resistance values could be used.

The filter 526 includes a pair of op amps arranged such that op amp 526a provides a reference voltage to op amp 526b capacitor 526c blocks low frequencies and the combination of the impedance of capacitor 56d and resistor 56e cuts the gain at higher frequencies thus the filter 526 filters out frequencies outside the pass band. The components are selected for the particular pass band desired by the filter which here would be somewhere in the 2 Hz to 20 Hz band.

The rectifier circuit 528 is shown integrated with an op amp 528a and is provided by Zener diode 528b to convert the AC components of the tone signal into a DC signal (pulse). This voltage is directly proportional to the level of the sub-audible tone.

The comparator 530 provided as op amp 530a has the fixed voltage threshold is used to compare the level of the DC pulse from sub audible tone to a fixed voltage. The output of the comparator provides an input to the FET transistor 532 (with suitable bias resistors not referenced) that provides the buffer driver circuit to drive the signal to the controller 218 (FIG. 2).

These systems may or may not be networked (wired or wirelessly) to the internet for two-way communication, session updates, program updates, device software updates, remote diagnostics, and other functions.

The various components of the system described herein may be implemented as a computer program using a general-purpose computer system. Such a computer system typically includes a main unit connected to both an output device that displays information to a user and an input device that receives input from a user. The main unit generally includes a processor connected to a memory system via an interconnection mechanism. The input device and output device also are connected to the processor and memory system via the interconnection mechanism.

One or more output devices may be connected to the computer system. Example output devices include, but are not limited to, a cathode ray tube (CRT) display, liquid crystal displays (LCD) and other video output devices, printers, communication devices such as a modem, and storage devices such as disk or tape. One or more input devices may be connected to the computer system. Example input devices include, but are not limited to, a keyboard, keypad, track ball, mouse, pen and tablet, communication device, and data input devices. The invention is not limited to the particular input or output devices used in combination with the computer system or to those described herein.

The computer system may be a general purpose computer system which is programmable using a computer programming language, a scripting language or even assembly language. The computer system may also be specially programmed, special purpose hardware. In a general-purpose computer system, the processor is typically a commercially available processor. The general-purpose computer also typically has an operating system, which controls the execution of other computer programs and provides scheduling, debugging, input/output control, accounting, compilation, storage assignment, data management and memory management, and communication control and related services.

A memory system typically includes a computer readable medium. The medium may be volatile or nonvolatile, writeable or nonwriteable, and/or rewriteable or not rewriteable. A memory system stores data typically in binary form. Such data may define an application program to be executed by the microprocessor, or information stored on the disk to be processed by the application program. The invention is not limited to a particular memory system.

A system such as described herein may be implemented in software or hardware or firmware, or a combination of the three. The various elements of the system, either individually or in combination may be implemented as one or more computer program products in which computer program instructions are stored on a computer readable medium for execution by a computer. Various steps of a process may be performed by a computer executing such computer program instructions. The computer system may be a multiprocessor computer system or may include multiple computers connected over a computer network. The components shown in the various figures may be separate modules of a computer program, or may be separate computer programs, or may include separate modules or programs, which may be operable on separate computers. The data produced by these components may be stored in a memory system or transmitted between computer systems.

Having now described exemplary embodiments, it should be apparent to those skilled in the art that the foregoing is merely illustrative and not limiting, having been presented by way of example only. Numerous modifications and other embodiments are within the scope of one of ordinary skill in the art and are contemplated as falling within the scope of the invention.

What is claimed is:

1. A plug detection circuit arrangement to detect insertion of a plug into a receptacle, the circuit arrangement comprising:
   an audio source that provides on a channel an audio signal having a superimposed sub audible audio signal;
   the receptacle having contacts configured to receive the plug inserted into the receptacle, wherein the receptacle is a switchless receptacle;
   a current sense circuit coupled between the receptacle and the channel of the audio source;
   an amplifier coupled across the current sense circuit to amplify the audio signal having the superimposed sub audible audio signal;
   a band pass filter coupled to an output of the amplifier, the band pass filter configured to pass the superimposed sub audible audio signal having a frequency in a range of about 2 Hz to 20Hz; and
   circuitry to convert the passed signal into a digital signal to provide an input signal to a controller to indicate the presence of the plug inserted into the receptacle.

2. The circuit arrangement of claim 1, wherein the circuitry to convert further comprises
   a rectifier circuit coupled to the band pass filter to convert the signal from the band pass filter into a DC signal.

3. The circuit arrangement of claim 2, wherein the circuitry to convert further comprises
   a comparator circuit coupled to the rectifier circuit.

4. The circuit arrangement of claim 3, wherein the circuitry to convert further comprises
   a driver circuit.

5. The circuit arrangement of claim 1, wherein the pass band of the band pass filter is 2 Hz to 20 Hz, and an amplitude level of the superimposed sub audible audio signal is in a range of about −18 db to −6 db sound pressure level that is a local acoustic pressure deviation from an ambient atmospheric pressure.

6. The circuit arrangement of claim 1, wherein the pass band of the band pass filter is a range of about 8 Hz to 18 Hz.

7. The circuit arrangement of claim 1, wherein the pass band of the band pass filter is about 15 Hz.

8. The circuit arrangement of claim 1 wherein the plug is an audio plug from the audio source.

9. A system comprising:
   a cardio exercise machine;
   a receptacle having contacts configured to receive a plug inserted into the receptacle, wherein the receptacle is a switchless receptacle supported by the cardio exercise machine;
   an audio source that provides on a channel an audio signal having a superimposed sub audible audio signal;
   a plug insertion detector circuit comprising:
      a current sense circuit coupled between the receptacle and the channel of the audio source;
      an amplifier coupled across the current sense circuit to amplify the audio signal having the superimposed sub audible audio signal;
      a band pass filter coupled to an output of the amplifier, the band pass filter configured to pass the superimposed sub audible audio signal having a frequency in a range of about 2 Hz to 20Hz;
      circuitry to convert the passed signal into a digital signal to indicate the presence of the plug inserted into the receptacle; and
   a controller that receives the digital signal that indicates insertion of the plug and that controls generation of audio directions to a user of the cardio exercise machine.

10. The system of claim 9, further comprising:
    a port configured to receive a removable computer storage device; and with the controller comprising:
    a computing device configured to:
    receive data from the removable computer storage device, which data are related to a fitness level of the user;
    select a workout program based at least in part on the data;
    control operations of the cardio exercise machine based at least in part on the workout program;
    generate audio signals that comprise the audio directions that are based on at least one of the user's operation of the cardio exercise machine and the selected workout program; and the controller causes the generated audio signals to be sent to the receptacle.

11. The system of claim 9 wherein the exercise machine comprises a treadmill, stationary bicycle, stair-climber, elliptical trainer, ski-trainer, or rowing machine.

12. The system of claim 9 wherein the pass band of the band pass filter is 2 Hz to 20 Hz, and an amplitude level of the superimposed sub audible audio signal is in a range of about −18 db to −6 db sound pressure level that is a local acoustic pressure deviation from an ambient atmospheric pressure.

13. The system of claim 9 wherein the pass band of the band pass filter is a range of about 8 Hz to 18 Hz.

14. The system of claim 9 wherein the pass band of the band pass filter is about 15 Hz.

15. The system of claim 9 wherein the plug detection circuitry further comprises:
    a rectifier circuit to convert the passed signal from the band pass filter into a DC signal.

16. The system of claim 15 wherein the plug detection circuitry further comprises:
    a comparator circuit coupled to the rectifier circuit.

17. The system of claim 16 wherein the plug detection circuitry further comprises:
    a driver circuit.

18. The circuit arrangement of claim 1, further comprising:
    circuity to insert the superimposed sub audible audio signal on the channel.

19. The circuit arrangement of claim 18, wherein the circuity includes a processor that executes software to produce the superimposed sub audible audio signal that is inserted on the channel.

20. The circuit arrangement of claim 18, wherein the circuity includes a mixer diode to produce the superimposed sub audible audio signal that is inserted on the channel.

21. The circuit arrangement of claim 9, wherein the controller executes software to insert the superimposed sub audible audio signal on the channel.

\* \* \* \* \*